United States Patent Office 3,849,403
Patented Nov. 19, 1974

3,849,403
2,3,4,5-TETRAHYDRO-1,1,5,5-TETRASUBSTITUTED-1H-3-BENZAZEPINES
John P. Yardley, King of Prussia, Richard W. Rees, St. Davids, and Herchel Smith, Wayne, Pa., assignors to American Home Products Corporation, New York, N.Y.
No Drawing. Continuation of abandoned application Ser. No. 725,135, Apr. 29, 1968. This application Mar. 29, 1972, Ser. No. 239,394
Int. Cl. C07d 41/08
U.S. Cl. 260—239 BB            3 Claims

ABSTRACT OF THE DISCLOSURE 2,3,4,5-Tetrahydro-1,1,5,5-tetrasubstituted-1H - 3-benzazepines, having (lower)alkyl or concatenated-(lower)alkyl substitutents at the 1,1,5 and 5-positions, optionally substituted at the 3-position with nitrogen-, oxygen- or sulfur- containing groups or with substituted or unsubstituted, saturated or unsaturated alkyl groups, and at the 7-position with nitro, amino, halo, hydroxy (or esterified or etherified derivatives of hydroxy) (I) and their salts are prepared by reducing the corresponding 2,4-dione (II) or, if desired, replacing the 3-position hydrogen in (Ia) or (IIa) with the required substituent. Nitration, reduction, diazotization, hydrolysis, or reaction with a copper halide under Sandmeyer conditions, esterification and/or etherification of (Ia) or (IIa) provide the corresponding 7-position substituents. Compounds (I) and their salts have analgesic activity.

---

This is a continuation of application Ser. No. 725,135, filed Apr. 29, 1968, and now abandoned.

This invention relates to novel organic compounds and to novel intermediates employed in their preparation. In particular, the present invention is directed to 2,3,4,5-tetrahydro - 1,1,5,5 - tetrasubstituted-1H-3-benzazepines, a new class of compounds possessing unexpected and useful pharmacological properties.

DESCRIPTION OF THE INVENTION

The compounds embraced by the present invention are members selected from (a) the benzazepines represented by Formula I:

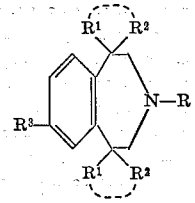

wherein

R is hydrogen, (lower)alkenyl, halo(lower)alkenyl, (lower)alkynyl, nitroso, amino, carboxamidino, formyl, (lower)alkylsulfonyl, phenylsulfonyl, aroyl and substituted aroyl, particularly benzoyl, cyclo(lower)alkylcarbonyl, (lower)alkylcarbonyl or Z-(lower)alkylene wherein Z is hydrogen, cyclo(lower)alkyl, phenyl, halophenyl, nitrophenyl, aminophenyl, (lower)alkoxyphenyl, amino, (lower)alkylamino, di(lower)alkylamino, hydroxy, (lower)alkoxy, (lower)alkanoyloxy or carbo(lower)alkoxy;

$R^1$ and $R^2$, independently, are (lower)alkyl or, taken together, are —$(CH_2)_n$— wherein $n$ is a whole number of from about 2 to about 6; and $R^3$ is hydrogen, hydroxy, nitro, amino, halo, (lower)alkoxy or (lower)alkanoyloxy; and (b) a pharmaceutically-acceptable non-toxic acid-addition salt thereof.

Special mention is made of a number of valuable embodiments of this invention. These are:

2,3,4,5-tetrahydro - 1,1,5,5-tetramethyl - 1H-3-benzazepine-3-carboxaldehyde, a compound of Formula I wherein R is the formyl group, $R^1$ and $R^2$ are methyl and $R^3$ is hydrogen.

2,3,4,5-tetrahydro - 1,1,3,5,5-pentamethyl - 1H-3-benzazepine, a compound of Formula I wherein R, $R^1$ and $R^2$ are methyl and $R^3$ is hydrogen, and especially the hydrogen chloride addition salt thereof;

2,3,4,5-tetrahydro - 1,1,5,5-tetramethyl-1H-3-benzazepine-3-carboxamidine, a compound of Formula I wherein R is the carboxamidino group, $R^1$ and $R^2$ are methyl and $R^3$ is hydrogen, and especially the hydrogen chloride addition salt thereof;

2,3,4,5-tetrahydro - 1,1,5,5-tetramethyl-1H-3-benzazepine-3-acetic acid, t-butyl ester, a compound of Formula I wherein R is the t-butoxycarboxymethyl group, $R^1$ and $R^2$ are methyl and $R^3$ is hydrogen;

2,3,4,5-tetrahydro - 1,1,5,5-tetramethyl-3-nitroso-1H-3-benzazepine, a compound of Formula I wherein R is the nitroso group, $R^1$ and $R^2$ are methyl and $R^3$ is hydrogen;

3-amino-2,3,4,5-tetrahydro - 1,1,5,5-tetramethyl-1H-3-benzazepine, a compound of Formula I wherein R is the amino group, $R^1$ and $R^2$ are methyl and $R^3$ is hydrogen;

3-benzoyl-2,3,4,5-tetrahydro - 1,1,5,5-tetramethyl-1H-3-benzazepine, a compound of Formula I wherein R is benzoyl, $R^1$ and $R^2$ are methyl and $R^3$ is hydrogen;

3-benzyl-2,3,4,5 - tetrahydro-1,1,5,5-tetramethyl-1H-3-benzazepine, a compound of Formula I wherein R is benzyl, $R^1$ and $R^2$ are methyl, $R^3$ is hydrogen, and especially the hydrogen chloride addition salt thereof;

3-benzoyl-7-nitro-2,3,4,5-tetrahydro - 1,1,5,5-tetramethyl-1H-3-benzazepine, a compound of Formula I wherein R is benzoyl, $R^1$ and $R^2$ are methyl and $R^3$ is nitro;

3-benzoyl-7-amino - 2,3,4,5-tetrahydro - 1,1,5,5-tetramethyl-1H-3-benzazepine, a compound of Formula I wherein R is benzoyl, $R^1$ and $R^2$ are methyl, $R^3$ is amino, and especially the hydrogen chloride acid addition salt thereof;

3 - benzyl - 7 - amino-2,3,4,5-tetrahydro-1,1,5,5-tetramethyl - 1H-3-benzazepine, a compound of Formula I wherein R is benzyl, $R^1$ and $R^2$ are methyl, $R^3$ is amino, and especially the hydrogen chloride addition salt thereof;

3 - benzyl - 7-hydroxy-2,3,4,5-tetrahydro-1,1,5,5-tetramethyl - 1H-3-benzazepine, a compound of Formula I wherein R is benzyl, $R^1$ and $R^2$ are methyl, $R^3$ is hydroxy, and especially the hydrogen chloride addition salt thereof;

7 - hydroxy - 2,3,4,5-tetrahydro-1,1,5,5-tetramethyl-1H-3-benzazepine, a compound of Formula I wherein R is hydrogen, $R^1$ and $R^2$ are methyl and $R^3$ is hydroxy;

3 - allyl - 2,3,4,5-tetrahydro-1,1,5,5-tetramethyl-1H-3-benzazepine, a compound of Formula I wherein R is allyl, $R^1$ and $R^2$ are methyl, $R^3$ is hydrogen, and especially the hydrogen chloride addition salt thereof;

3 - propargyl-2,3,4,5-tetrahydro-1,1,5,5-tetramethyl-1H-3-benzazepine, a compound of Formula I wherein R is propargyl, $R^1$ and $R^2$ are methyl, $R^3$ is hydrogen, and especially the hydrogen chloride addition salt thereof;

3 - (3 - methyl - 2-butenyl)-2,3,4,5-tetrahydro-1,1,5,5-tetramethyl-1H-3-benzazepine, a compound of Formula I wherein R is 3-methyl-2-butenyl, $R^1$ and $R^2$ are methyl and $R^3$ is hydrogen;

3 - (β-phenethyl)-2,3,4,5-tetrahyro-1,1,5,5-tetramethyl-1H-3-benzazepine, a compound of Formula I wherein R is β-phenethyl, $R^1$ and $R^2$ are methyl and $R^3$ is hydrogen; and 3 - (3 - dimethylaminopropyl)-2,3,4,5-tetrahydro-1H-3-benzazepine, a compound of Formula I wherein R is 3-dimethylaminopropyl, $R^1$ and $R^2$ are methyl and $R^3$ is hydrogen.

Preferred embodiments of Formula I include compounds of Formula Ia:

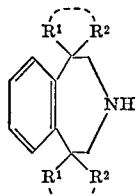

wherein $R^1$ and $R^2$, independently, are (lower)alkyl or, taken together, are —$(CH_2)_n$— wherein $n$ is a whole number of from about 2 to about 6.

Special mention is made of a particularly valuable species embraced by this group of compounds, namely, 2,3,4,5-tetrahydro-1,1,5,5-tetramethyl-1H-3-benzazepine, a compound of Formula Ia wherein $R^1$ and $R^2$ are methyl, and especially the acid addition salt thereof with hydrogen chloride.

The instant invention also contemplates, as valuable intermediates in the preparation of compounds of Formula I, the novel benzazepinediones of Formula II:

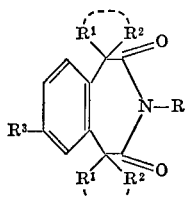

wherein R is hydrogen, (lower)alkenyl, halo(lower)alkenyl, (lower)alknyl, nitroso, amino, carboxamidino, formyl, (lower)alkylsulfonyl, phenylsulfonyl, benzoyl, cyclo(lower)alkylcarbonyl, (lower)alkylcarbonyl, or Z-(lower)-alkylene wherein Z is hydrogen, cyclo(lower)alkyl, phenyl, halophenyl, nitrophenyl, aminophenyl, (lower)alkoxyphenyl, amino, (lower)alkylamino, di(lower)alkylamino, hydroxy, (lower)alkoxy, (lower)alkanoyloxy or carbo(lower)alkoxy; $R^1$ and $R^2$, independently, are (lower)alkyl or, taken together, are —$(CH_2)_n$— wherein $n$ is a whole number of from about 2 to about 6; and $R^3$ is hydrogen, hydroxy, nitro, amino, halo, (lower)alkoxy or (lower)alkanoyloxy.

A useful and preferred species is 3-(3-dimethylaminopropyl)-2,3,4,5-tetrahydro-1,1,5,5-tetramethyl-1 - H - 3-benzazepine-2,4-dione, a compound of Formula II wherein R is 3-dimethyl-aminopropyl, $R^1$ and $R^2$ are methyl and $R^3$ is hydrogen.

Especially valuable members of this class of compounds are those of Formula IIa:

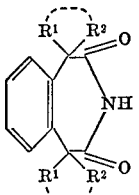

wherein $R^1$ and $R^2$, independently, are (lower)alkyl or, taken together, are —$(CH_2)_n$— wherein $n$ is a whole number of from about 2 to about 6.

Special mention is made of a particularly useful member of this series. This is 2,3,4,5-tetrahydro-1,1,5,5-tetramethyl-1H-3-benzazepine-2,4-dione, a compound of Formula IIa wherein $R^1$ and $R^2$ are methyl.

By the term "(lower)alkyl" and derivations thereof such as "lower)alkoxy," "(lower)alkanoyloxy," "(lower)alkenyl," "(lower)alkylene," "carbo(lower)alkoxy," "(lower)alkylsulfonyl," "cyclo(lower)alkylcarbonyl,' "(lower)alkylcarboxy," and the like is intended a group comprising a branched or straight hydrocarbon chain containing from about one to about 6 carbon atoms. Representative (lower)alkyl groups are thus methyl, ethyl, n-propyl, i-propyl, n-butyl, s-butyl, t-butyl, n-pentyl, isopentyl, hexyl, and the like, and for $R^1$ and $R^2$, the preferred groups are n-(lower)alkyl, especially methyl. Embraced by (lower)alkoxy are groups containing from about one to about six carbon atoms and joined through an oxygen ether bond such as methoxy, ethoxy, i-propoxy, butoxy, hexyloxy and the like. It is to be understood that when the nature of any particular functional group in these substituents, such as an olefinic bond in an alkenyl group, requires two carbon atoms, the hydrocarbon portion of the substituent will have from about two to about six carbon atoms. "(lower)alkanoyloxy" is typified by acetoxy, propanoyloxy, butanoyloxy, pentanoyloxy, hexanoyloxy and the like, while representatives of the term "(lower)alkenyl" include vinyl, allyl, 2-methyl-2-propenyl, 2-methyl-2-butenyl, 2-butenyl, 1,3-butadienyl, 2-pentenyl and the like. "(Lower)alkylene" includes methylene, i.e., —$CH_2$— and ethylene, i.e., —$CH_2CH_2$—, propylene, i.e., —$CH_2CH_2CH_2$—, and the like. "Halo" includes chloro, bromo, fluoro, and iodo, with chloro and fluoro preferred.

The substituent R, as noted above, can be a nitrogen-containing group, such as nitroso, amino, carboxamidino and the like, or an oxygen-containing group, such as the carboxaldehyde (formyl) group and the like, or a sulfur-containing group such as (lower)alkylsulfonyl or phenylsulfonyl and the like but R preferably is hydrogen or a substituent of an essentially hydrocarbon (or substituted-hydrocarbon) nature. For example, R may also be (lower) alkyl, e.g., methyl; (lower) alkenyl, such as vinyl, allyl, 2-methyl-2-propenyl, 2-propenyl, 2-butenyl, 2-methyl-2-butenyl and the like; or (lower)alkynyl, such as ethynyl, propynyl, propargyl and the like. In addition R may me a substituted (lower)alkyl group in which one hydrogen atom of the alkyl group is replaced by a substituent such as cyclo(lower)alkyl of from about three to about six carbon atoms, as, for example, cyclopropyl; phenyl, including halophenyl, e.g., chlorophenyl, iodophenyl, bromophenyl; nitrophenyl, aminophenyl, (lower) alkoxyphenyl and the like; amino, including mono- and di(lower)alkylamino and cyclo(lower)alkylamino groups; hydroxy; (lower)alkoxy; (lower)alkanoyloxy or carbo (lower)alkoxy. Examples of these substituted (lower)alkyl groups are thus cyclopropylmethyl, phenylethyl, 3,4-dichlorobenzyl, 4-aminophenylethyl, methylaminopropyl, 2-piperidinylethyl, 2-ethoxyethyl, 2-hydroxyethyl, 2-acetoxyethyl, carbo-t-butoxymethyl and the like. Also encompassed within the scope of R are substituted (lower) alkenyl such as halo(lower)alkenyl, e.g., 2-halo-2-propenyl.

The compounds of Formula I of this invention and their salts are non-toxic analgesics having activity in standard pharmacological tests of the same order of magnitude as d-propoxyphene hydrochloride. This makes them useful to treat conditions in valuable domestic animals, such as dogs and horses, and in laboratory animals, such as rats, mice and the like, responsive to administration of analgesic agents, such as the relief of pain. When used for these purposes, compounds of Formula I and their salts may be administered parenterally or orally in any of the usual pharmaceutical forms including tablets, powders, suspensions, solutions, syrups, and the like. Particularly valuable formulations comprise sustained release preparations; and all of them may be compounded by any of the known procedures. Dosages will vary with the route of administration and severity of the symptoms but will, in general, conform to regimens established for analgesics like propoxyphene hydrochloride (Merck Index, Seventh Edition, p. 862 (1960)).

Since nearly all of the compounds of Formula I are basic (except for those wherein R is the oxygen-containing or sulfur-containing groups), particularly valuable embodiments of the invention are the nontoxic pharmaceutically-acceptable acid addition salts of all basic compounds of Formula I. Such salts include those derived from organic and inorganic acids such as, without limitation, hydrochloric, hydrobromic, sulfuric, phosphoric, methanesulfonic, acetic, lactic, succinic, malic, aconitic, phthalic, tartaric, embonic, and like acids, by standard procedures, such as mixing an acetone solution of the base with the stoichiometrical amount of the acid in a solvent, such as acetone, if desired, and evaporating the solvents to leave the desired salt as a residue. Also, since many of the compounds of the instant invention possess a secondary amino group (i.e., those of Formula I wherein R is H, in particular), various obvious derivatives may be made without departing from the spirit of the present invention. For example, various quaternary salts such as the methiodide or methochloride may be prepared. So too, the N-oxides of the instant compounds demonstrate important properties.

The compounds of Formula I of this invention are prepared by reduction of a compound of Formula II:

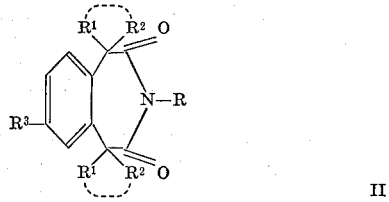

with a reducing agent, such as an alumino-hydride, particularly lithium aluminum hydride. In Formula II it is to be noted that where R and $R^3$ are as defined as above, in certain instances, side reactions may occur. For example, when these groups are alkanoyloxy, carbo(lower)alkoxy, formyl, benzoyl, cyclo(lower)alkylcarbonyl, (lower)alkylcarbonyl and the like, conversion to the correspondingly reduced groups will occur. If it is not desired to reduce such groups, it is preferred to use a compound of Formula II with non-labile groups, such as hydrogen for example, and to introduce the desired groups by subsequent steps, as will be shown hereinafter.

While R in Formula II is preferably hydrogen, other inert groups embraced by the above definition of R can be present instead. For example, in place of hydrogen, there can be a methyl, or other (lower) alkyl group, or a phenyl(lower)alkyl group, such as benzyl. When such a group on the nitrogen atom is the same as the R group in the desired final compound of Formula I, no further reactions are necessary after reduction. If a different R group such as alkenyl, alkynyl, alkoxyalkyl, or the like are desired, the employment of additional steps is preferred for maximization of yield and purity. In such instances, the reduction is preferably effected with an N-unsubstituted compound of Formula II to provide the corresponding compound of Formula I and then, by application of various procedures, it is possible to introduce a wide variety of substituents (R) onto the nitrogen atom of the benzazepine nucleus. For example, treatment of a compound of Formula I (R=H) with an alkenyl- or alkynyl halide, e.g., chloride, or sulfonate ester provides the corresponding compound of Formula I wherein R is alkenyl or alkynyl, respectively. Where an alkyl or phenylalkyl group is desired and use of the corresponding alkyl halide or phenylalkyl halide may give rise to a quaternary salt, the group is preferably introduced through use of an acyl or aroyl reagent with subsequent reduction of the amide thus formed. For example, treatment of a compound of Formula I (R=H) with an acyl or phenacyl halide or anhydride or a cyclo(lower)alkylcarboxylic acid halide, such as cyclopropane carboxylic acid chloride, followed by lithium aluminum hydride reduction can be used. Additionally, certain methods are available as alternatives in certain cases: for example, compounds of Formula I wherein R is methyl can be obtained by treatment of the compound of Formula I wherein R is hydrogen, with anhydrous chloral followed by reduction, e.g., with lithium aluminum hydride. Other substituents (R) within the above definition can be introduced into compounds of Formula I (R is hydrogen) by subsequent steps to be exemplified in detail hereinafter. For example, the 3-carboxaldehyde (formyl) group is introduced by treatment with anhydrous chloral; the 3-carboxamidino group is introduced by treatment with an amidinating agent, for example, 3,5-dimethylpyrrazole-carboxamidine nitrate; the omega-carboalkoxyalkyl group is introduced by treatment with the corresponding carboalkoxyalkyl halide; the omega-alkyl-aminoalkyl group is introduced by treatment with the corresponding omega-aminoalkyl halide; the nitroso group is introduced with a reagent such as sodium nitrite and reduction of the nitroso group provides the compounds wherein R is amino.

By use of standard procedures, it is possible to introduce substituent $R^3$ in the 7-position of the benzazepine, using, as the substrate, a compound of Formula I wherein $R^3$ is hydrogen, providing of course, that those substituents represented by R are inert to the reaction conditions. Thus, nitration provides the 7-nitro compound ($R^3=NO_2$) which on reduction with hydrogen in the presence of a noble metal catalyst affords the 7-amino compound ($R^3=NH_2$), which is transformed by standard diazotization procedures, e.g. with nitrous acid, into the diazo intermediate, which is hydrolyzed to the phenol ($R^3=OH$) in an aqueous acid solution and this, is desired, may be acylated or etherified by entirely conventional techniques. The corresponding 7-halo compounds ($R^3$ is chloro, bromo, iodo or fluoro) are provided by reacting the diazo intermediate under the well known Sandmeyer conditions, i.e., replacing the diazo group with halo groups under the influence of cuprous salts. Hydrogenolysis of the corresponding compounds of Formula I (R is arylalkyl, e.g., benzyl) is a very useful method also to provide compounds of Formula I wherein R is hydrogen and $R^3$ is amino, hydroxy, or (lower)-alkoxy. R can then be transformed to any of the defined values by the subsequent operations outlined above and, if desired, the 7-hydroxy group can be esterified.

Compounds of Formula II can be prepared in a number of ways. For example, an o-phenylene-disubstituted diacetic acid anhydride (III) can be treated with concentrated aqueous ammonia followed by evaporation of the mother liquors and pyrolysis of the residue at temperatures of about 190–300° C. to provide compounds of Formula II wherein R is H according to the following:

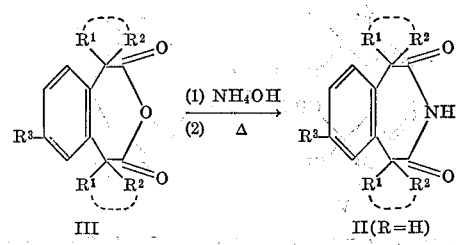

wherein $R^1$, $R^2$ and $R^3$ are as defined above. If desired, these can be converted to compounds of Formula II, wherein R has the other values defined above, by alkylation with a compound of formula RX wherein X is a displaceable group, such as halogen or sulfonate ester in the presence of sodium hydride or an alkali metal amide.

Another way to obtain compounds of Formula II is to treat the anhydride III with a primary amine $RNH_2$ to form a product of Formula IV and to pyrolyze this to obtain the compound of Formula II with the corresponding group R:

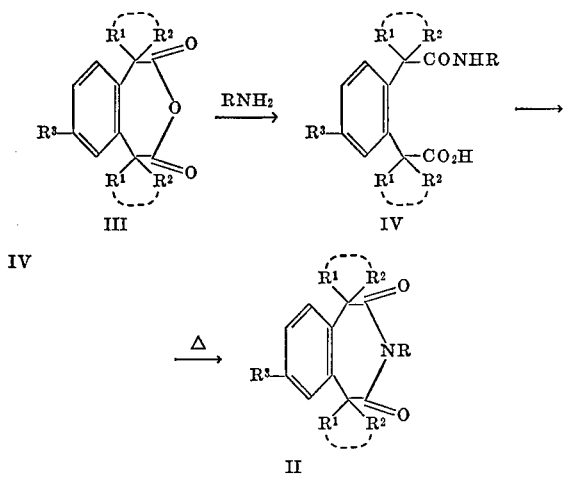

wherein R is other than hydrogen, R³ is hydrogen, and R¹ and R² are as defined above. If one desires to proceed from a compound of Formula II wherein R³ is hydrogen, to those in which R³ has the other values defined above, resort is made to nitration, reduction to the 7-amino group, diazotization, hydrolysis, reaction of the diazo compound with cuprous halide, esterification and etherification, by entirely conventional techniques.

The useful starting materials of Formula III, wherein R³ is hydrogen, can be obtained by methods which will be familiar to those skilled in the art. These methods follow the following reaction sequence.

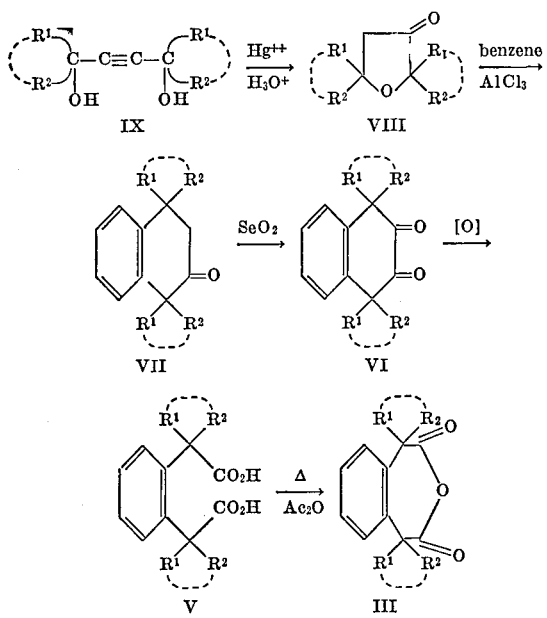

wherein R¹ and R² are as above defined. Starting materials are the appropriate acetylenic 1,4-ditertiary glycols of Formula IX which are described in Kharasch and Rheinmuth, "Grignard Reactions of Non-Metallic Substances" Prentice Hall, Inc., New York (1954) pages 1347–1362 or which can be prepared by those skilled in the art by reference to the procedures cited herein. Treatment of IX with a mercuric salt in acid solution causes hydration of the acetylenic bond and internal ether formation to form a 2,2,5,5-tetrasubstituted tetrahydrofuranone of Formula VIII. Compound VIII on condensation with benzene in the presence of $AlCl_3$ or an obvious chemical equivalent thereof affords the β-tetralone of Formula VII. Compound VII on $SeO_2$ oxidation is converted to the α-diketone of Formula VI. Oxidation of the compound VI with $KMnO_4$ or preferably periodic acid affords the di-acid of Formula V. Compound V in refluxing acetic anhydride undergoes facile anhydride formation to the compound of Formula III.

In a pharmacological evaluation of compounds for analgesic activity, they are tested *in vivo* in warm blooded lower animals by standard procedures. In one such method of analgesic evaluation, the rat tail flick method, modified from D'Amour and Smith, J. Pharmacol. 72, 74 (1941), groups of 10 male rats (150–200 g.) are placed in individual holders. The holders are placed so that a high intensity light beam shines on the tip of the tail. The intensity of the light beam is adjusted so that normal rats respond by moving their tails out of the light beam in 3 to 8 seconds. The average of two readings taken 20 minutes apart serves as a pre-drug control. Rats are selected for testing whose control readings agree within one second. Compounds are administered orally or intraperitoneally (i.p.) and reaction times are measured every 20 minutes for 2 hours after being drug administration. Post drug reaction times are compared to the control average and are tested for significance by the method of Bonnycastle and Bliss.

By way of illustration, in this test, 2,3,4,5-tetrahydro-1,1,5,5-tetramethyl-1H-3-benzazepine hydrochloride, administered i.p. in an aqueous vehicle, at 25 mg./kg. caused four rats to show analgesia, and was active; and at 50 mg./kg. caused six rats to show analgesia and was active.

DESCRIPTION OF THE PREFERRED EMBODIMENTS

The following examples, presented for purposes of illustration and not limitation, will further serve to typify the nature of this invention.

EXAMPLE 1

2,3,4,5-Tetrahydro-1,1,5,5-tetramethyl-1H-3-benzazepine and hydrochloride (a) 2,3,4,5 - Tetrahydro 1,1,5,5 - tetramethyl - 1H - 3-benzazepine-2,4-dione: α,α'-o-Phenylenediisobutyric acid [prepared by the procedure of L. R. C. Barclay, C. E. Milligan and N. D. Hall, Can. J. Chem., 40, 1664 (1962), 18 g.] is added to concentrated aqueous ammonia (75 ml.). The mixture is heated to boiling and a clear solution results. The solution is concentrated to a small volume and then heated in a fused salt bath over a period of one hour until a bath temperature of 290° C. is obtained. The residue is cooled and crystallized from acetone to yield 12 g. of the product, m.p. 142–144° C.

*Analysis.*—Found: C, 72.70; H, 7.21; N, 6.15. $C_{14}H_{17}NO_2$ requires: C, 72.70; H, 7.41; N, 6.06. IR(KBr) 1705 and 1665 cm.⁻¹ (lower band stronger). NMR ($CDCl_3$) peaks at 1.68 (12H singlet 4 $CH_3$), 7.38 (centre 4H$A_2B_2$ multiplet aromatic protons) and 8.1 p.p.m. (1H broad peak W ½ H 10 c.p.s. imide proton).

2,3,4,5 - tetrahydro - 1,1,5,5 - tetramethyl - 1H - 3-benzazepine: 2,3,4,5-Tetrahydro-1,1,5,5-tetramethyl-1H-3-benzazepine-2,4-dione, 10.0 g., in 200 ml. of tetrahydrofuran is added slowly to a vigorously stirred suspension of 12.5 g. of lithium aluminum hydride in an ether (300 ml.)-tetrahydrofuran (100 ml.) mixture. The reaction mixture is stirred under reflux during 44 hr., then is cooled, stirred and treated slowly with 62.5 ml. of 3% NaOH solution (added under a blanket of nitrogen). The precipitate is filtered and washed with a hot ether-THF mixture. The combined filtrates are evaporated and the crystalline residue is taken into ether and washed with brine, dried ($Na_2SO_4$) and evaporated to 8.7 g. of a crystalline residue. The amine proves to be very soluble in the usual organic solvents. The analytical sample, m.p., 77–80° C. is obtained by sublimation of a portion.

*Analysis.*—Found: C, 82.99; H, 10.28; N, 6.81. $C_{14}H_{21}N$ requires: C, 82.70; H, 10.41; N, 6.89. NMR ($CDCl_3$) peaks at 1.39 (12H singlet), 2.25 (1H broad hump N–H), 3.02 (4H singlet W ½ H 2.5 c.p.s.), 7.35 p.p.m. (4H centre $A_2B_2$ multiplet).

The residual base (8.3 g.) in ether (200 ml.) is treated slowly with an excess of 6.6 N isopropanolic HCl. A crystalline precipitate, 8.7 g., m.p., 270–280° C. of the amine hydrochloride is immediately formed. The analytical sample, m.p. 275° C., is obtained by recrystallization from dichloromethane-acetone.

*Analysis.*—Found C, 70.01; H, 9.08; N, 5.84; Cl, 14.56. $C_{14}H_{22}NCl$ (203.32) requires: C, 70.2; H, 9.24; N, 5.83; Cl, 14.82.

EXAMPLE 2

2,3,4,5-Tetrahydro-1,1,5,5-tetramethyl-1H-3-benzazepine-3-carboxaldehyde 2,3,4,5 - Tetrahydro - 1,1,5,5 - tetramethyl - 1H - 3-benzazepine, free base, 1.3 g., $6.36 \times 10^{-3}$ moles, in 3 ml. of $CHCl_3$ is cooled in an ice-acetone bath and treated dropwise during 20 minutes with anhydrous chloral, 0.9 ml., 1.35 g., $9.2 \times 10^{-3}$ moles. The mixture is stirred at room temperature under nitrogen during 1 day, refluxed for 30 minutes and solvent is removed under reduced pressure. The residue dissolved in $Et_2O$ is washed with dilute HCl, water, saturated $NaHCO_3$ solution, brine, and dried over $Na_2SO_4$. Evaporation of the $Et_2O$ and crystallization of the residue from hexane affords 1.2 g. of product, m.p. 96° C. The analytical sample, m.p., 116–117° C. is obtained by recrystallization of a portion from hexane. IR 1655 cm.$^{-1}$.

*Analysis*—Found: C, 78.04; H, 9.57. $C_{15}H_{21}NO$ requires: C, 77.88; H, 9.15.

EXAMPLE 3

2,3,4,5-Tetrahydro-1,1,3,5,5-pentamethyl-1H-3-benzazepine and hydrochloride 2,3,4,5 - Tetrahydro - 1,1,5,5 - tetramethyl - 1H - 3-benzazepine-3-carboxaldehyde, 1.1 g., in $Et_2O$: THF (1:1, 100 ml.) is refluxed with 500 mg. of $LiAlH_4$ under nitrogen during 4 hours. The reaction mixture is allowed to stand at about 23° C. overnight; excess hydride is decomposed by addition of 2.5 ml. of 3% aqueous NaOH solution. The reaction mixture is filtered through filter aid to remove inorganics and the filtrate is evaporated. The residue is taken into $Et_2O$, washed with brine, dried over $Na_2SO_4$ and the $Et_2O$ solution is treated with isopropanolic HCl. The crystalline precipitate is recrystallized once from acetone to give the analytical sample, m.p., 216–218° C.

*Analysis.*—Found: C, 70.88; H, 9.53; N, 5.52; Cl, 13.97. $C_{15}H_{23}N \cdot HCl$; C, 70.67; H, 9.44; N, 5.37; Cl, 13.83.

EXAMPLE 4

2,3,4,5-Tetrahydro-1,1,5,5-tetramethyl-1H-3-benzazepine-3-carboxamidine and Hydrochloride 2,3,4,5-Tetrahydro-1,1,5,5-tetramethyl - 1H - 3 - benzazepine HCl, 5 g., $2.08 \times 10^{-2}$ moles, is converted to the free base by treatment of its aqueous solution with excess potassium carbonate solution and extraction with ether. The extract is washed with brine, dried over $Na_2SO_4$ and is evaporated. The residue and finely powdered 3,5 - dimethylpyrazolecarboxamidine nitrate, 3 g., $1.5 \times 10^{-2}$ moles, are heated in an oil bath at 130–132° C. during 25 minutes. Since a clear melt is not obtained after this reaction time, heating is continued for a further 25 minutes during which time the temperature of the oil bath is gradually raised to 180° C. The cooled melt is washed with ether, dissolved in boiling acetone and reprecipitated by addition to ether (3–4 vols). The crystalline precipitate after recrystallization from acetone hexane affords 3.4 g. material, m.p., 172–178° C. which is found to be a mixture of the product (more soluble) and the starting amine nitrate salt. Fractional crystallization from acetone and acetone-hexane mixtures subsequently affords pure samples of product, 0.7 g., and 4,5-benzo-3,3,6,6-tetramethyl-1-azacycloheptene nitrate, 1 g., identity of which is shown by the strong nitrate absorption in the IR and conversion to its hydrochloride salt which is identical with an authentic sample. The analytical sample is crystallized from acetone-hexane, m.p. 180–184° C.

*Analysis.*—Found: C, 57.68, 57.77, 57.96; H, 7.91, 7.92, 7.98; N, 18.20. $C_{15}H_{24}N_4O_3$ 1¼ $H_2O$ requires: C, 57.70; H, 7.91; N, 17.95.

EXAMPLE 5

2,3,4,5-Tetrahydro-1,1,5,5-tetramethyl-1H-3-benzazepine-3-Acetic Acid, t-Butyl Ester 2,3,4,5 - Tetrahydro - 1,1,5,5 - tetramethyl - 1H - 3-benzazepine, 1.15 g., $5.65 \times 10^{-3}$ moles, is refluxed for 4 hours under nitrogen with 5 ml. of acetonitrile containing t-butyl-α-chloroacetate, 1.14 g. $7.6 \times 10^{-3}$ moles, and triethylamine, 0.79 g., $7.7 \times 10^{-3}$ moles. Acetonitrile is removed under vacuo and the residue is distributed between ether and dilute $NaHCO_3$ solution. The ether extract is washed with water (twice), brine, and dried over $Na_2SO_4$. The crystalline residue is recrystallized from aqueous methanol to give product, 1.5 g., m.p., 50–52° C. IR 1715 cm.$^{-1}$. NMR ($CDCl_3$): 9H singlet 1.38 (t-butyl group), 12H singlet 1.5 (4 $CH_3$), 4H singlet 2.93 (C–2 and C–4 methylenes), 2H singlet 3.47

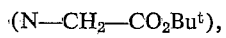

$(N—CH_2—CO_2Bu^t)$,

4H $A_2B_2$ system centered at 7.29 p.p.m. (aromatic protons).

*Analysis.*—Found: C, 75.31; H, 9.68; N, 4.48.

$C_{20}H_{31}NO_2$ (317.46) requires: C, 75.67; H, 9.84; N, 4.41.

EXAMPLE 6

2,3,4,5-Tetrahydro-1,1,5,5-tetramethyl-3-nitroso-1H-3-benzazepine 2,3,4,5 - Tetrahydro - 1,1,5,5-tetramethyl - 1H - 3-benzazepine, 2.5 g., $1.2 \times 10^{-2}$ moles, in 40 ml. of water containing hydrochloric acid, $2.4 \times 10^{-2}$ moles, is cooled to 0° C. and treated dropwise with a solution of 2.0 g. of $NaNO_2$ in 5 ml. of water. Precipitation of product occurs after 30 minutes. The precipitate is removed by filtration and recrystallization from acetone affords 1.15 g. of product, m.p., 101–103° C. An additional 550 mg. of crystalline solid, m.p., 101–103° C. separates from the aqueous mother liquors overnight. The analytical sample is recrystallized from acetone and has a m.p. of 109–111° C.

*Analysis.*—Found: C, 72.45; H, 8.65; N, 12.24. $C_{14}H_{20}N_2O$ requires: C, 72.38; H, 8.68; N, 12.06.

EXAMPLE 7

3-Amino-2,3,4,5-tetrahydro-1,1,5,5-tetramethyl-1H-3-benzazepine and Hydrochloride 1,2,4,5 - Tetrahydro - 1,1,5,5 - tetramethyl - 3 - nitroso-3H-3-benzazepine, 1.15 g. in ether-tetrahydrofuran (1:1, 120 ml.) is refluxed during 8 hours with 1 g. of $LiAlH_4$. Excess hydride is destroyed by the addition of 5 ml. of 3% NaOH solution. The solution is filtered from inorganics, stripped and the residue in $Et_2O$ is washed with brine and dried over $Na_2SO_4$. Treatment of the ether solution directly with isopropanolic hydrogen chloride affords a flocculent precipitate crystallizing from acetone-ether to give the product as its hydrochloride, m.p., 218–220° C. Structure proof rests on mass spectrum which shows the correct mass ion for the free base and no impurities.

EXAMPLE 8

3-Benzoyl-2,3,4,5-tetrahydro-1,1,5,5-tetramethyl-1H-3-benzazepine 2,3,4,5 - Tetrahydro - 1,1,5,5 - tetramethyl - 1H - 3-benzazepine hydrochloride, 10 g., $4.2 \times 10^{-2}$ moles, is added to a stirred mixture of $CH_2Cl_2$ (600 ml.) and $NaHCO_3$ (600 ml.) followed by benzoyl chloride (6 ml., 7.2 g., $5 \times 10^{-2}$ moles) and the mixture is stirred at room temperature during 3 hours. The organic layer is separated, filtered to clarify the solution and stripped. The residue is crystallized from hexane to give the product (11 g.), m.p., 135–137° C.

*Analysis.*—Found: C, 81.77; H, 8.01; N, 4.39. $C_{21}H_{25}NO$ (307.42) requires: C, 82.04; H, 8.20; N, 4.56.

EXAMPLE 9

3-Benzyl-2,3,4,5-tetramethyl-1H-3-benzazepine and Hydrochloride

3 - Benzoyl - 2,3,4,5 - tetrahydro - 1,1,5,5-tetramethyl-1H-3-benzazepine (2 g., $6.5 \times 10^{-3}$ moles) in a tetrahydrofuran:ether (1:1, 160 ml.) mixture is refluxed with $LiAlH_4$ (400 mg., $1.05 \times 10^{-2}$ moles) during 15 hours. Excess hydride is destroyed by the addition of 3% aqueous NaOH solution (2 ml.). The mixture is filtered from inorganic salts, stripped and the crystalline residue taken into ether. The ether solution is washed with brine, dried ($Na_2SO_4$) and treated with a slight excess of isopropanolic hydrogen chloride and the crystalline precipitate recrystallized from acetone-$CH_2Cl_2$ to give the product m.p. 245° C.

*Analysis.*—Found: C, 76.18; H, 8.46; N, 4.25; Cl, 10.94. $C_{21}H_{28}NCl$ (329.90) requires: C, 76.45; H, 8.55; N, 4.25; Cl, 10.75.

EXAMPLE 10

3-Benzoyl-7-nitro-2,3,4,5-tetrahydro-1,1,5,5-tetramethyl-1H-3-benzazepine

A solution of 3-benzoyl-2,3,4,5-tetrahydro-1,1,5,5-tetramethyl - 1H - 3 - benzazepine (3.5 g., $1.18 \times 10^{-2}$ moles) in acetic acid (5 ml.) is added dropwise, under nitrogen, during 1 hour to a stirred mixture of fuming nitric acid (11 ml. sp. gr. 1.5, $2.6 \times 10^{-1}$ moles) and acetic acid (6 ml.). Temperature is maintained in the range 0–5° C. throughout the addition. After 4 hours at room temperature the reaction mixture is poured onto crushed ice. The precipitate is filtered off, washed well with water and taken into an $Et_2O$—$CH_2Cl_2$ mixture. The organic layer is washed with $NaHCO_3$ solution, brine, dried ($Na_2SO_4$) and stripped. The crystalline residue (4 g.) is recrystallized from acetone-hexane to give the product (3.5 g.) m.p. 168–171° C.

*Analysis.*—Found: C, 71.71; H, 6.47; N, 7.60. $C_{21}H_{24}N_2O_3$ requires: C, 71.57; H, 6.86; N, 7.95.

EXAMPLE 11

3-Benzoyl-7-amino-2,3,4,5-tetrahydro-1,1,5,5-tetramethyl-1H-3-benzazepine and Hydrochloride A solution of 3-benzoyl-7-nitro-2,3,4,5-tetrahydro-1,1,5,5-tetramethyl-1H-3-benzazepine (7.5 g., $2.1 \times 10^{-2}$ moles) in MeOH (225 ml.) is added to a prereduced Pd on carbon catalyst (600 mg., 5%) in methanol (120 ml.) in a hydrogen atmosphere. Reduction is complete within 1 hour. After filtration from catalyst the solution is concentrated to a small volume and distributed between ether and $NaHCO_3$ solution. The ether solution of the free base is washed with brine, dried ($Na_2SO_4$) and treated with isopropanolic hydrogen chloride. The precipitated oil crystallizes on brief trituration with acetone to give the product in the form of its hydrochloride (6.5 g.), m.p. 243–245° C.

EXAMPLE 12

3-Benzyl-7-amino-2,3,4,5-tetrahydro-1,1,5,5-tetramethyl-1H-3-benzazepine and Hydrochloride 3 - Benzoyl - 7 - amino - 2,3,4,5 - tetrahydro-1,1,5,5-tetramethyl-1H-3-benzazepine hydrochloride (6.5 g.) is reconverted to its free base and reduced in refluxing tetrahydrofuran (160 ml.) with $LiAlH_4$ (3 g.) during 12 hours. Excess hydride is destroyed by the cautious addition of 6 ml. 3% NaOH solution. After filtration from inorganics the filtrate is stripped and the residue taken into ether, dried ($Na_2SO_4$) purified by precipitation as its semicrystalline hydrochloride, decantation of the mother liquors and reconversion to the free base (5.45). An analytical sample, m.p. 90–92° C. is obtained by recrystallization of a portion, twice, from hexane.

*Analysis.*—Found: C, 81.93; H, 8.90; N, 8.97. $C_{21}H_{28}N_2$ requires: C, 81.77; H, 9.15; N, 9.08.

EXAMPLE 13

3-Benzyl-7-hydroxy-2,3,4,5-tetrahydro-1,1,5,5-tetramethyl-1H-3-benzazepine and Hydrochloride 3 - Benzyl - 7 - amino-2,3,4,5-tetrahydro-1,1,5,5-tetramethyl-1H-3-benzazepine (5.3 g., $1.74 \times 10^{-2}$ moles) in $3N\ H_2SO_4$ (36 ml., $1.18 \times 10^{-1}$ moles) is cooled to $-5°$ C. and treated dropwise during 15 minutes with a solution of $NaNO_2$ (1.2 g., $1.74 \times 10^{-2}$ moles). The temperature of the mildly exothermic reaction mixture is kept below 3° C. throughout the addition. After a further 2 minutes, the solution is then added in 1–2 ml. portions during ca. 10 minutes to a solution of concentrated $H_2SO_4$ (25 ml.) in water (50 ml.) maintained at 75–85° C. The solution is maintained at ca. 85° C. during 25 minutes cooled and treated with excess $NaHCO_3$ solution and extracted with ether. The ether extract is concentrated to a small volume and filtered through a Woelm alumina column (40 g., Grade I, neutral) and eluted with ether until the eluate gave a negative reaction with isopropanolic HCl. The ether-eluate is cooled and treated with an excess of isopropanolic HCl. The residue crystallizes on trituration with acetone to give the product (4.9 g.), m.p. 245° C. (decomp.). The analytical sample m.p. 250–255° C. (decomp.) is crystallized from methanol-ether.

*Analysis.*—Found: C, 72.59; H, 7.87; N, 4.02. $C_{21}H_{28}NOCl$ requires: C, 72.91; H, 8.16; N, 4.05.

EXAMPLE 14

7-Acetoxy-3-benzyl-2,3,4,5-tetrahydro-1,1,5,5-tetramethyl-1H-3-benzazepine

Eight grams of 3-benzyl-7-hydroxy-2,3,4,5-tetrahydro-1,1,5,5-tetramethyl-1H-3-benzazepine and 50 ml. of acetic anhydride are heated at 100° C. for one hour. At the end of this time, the solution is cooled, rendered basic by the addition of dilute sodium hydroxide and is filtered. The solid thus collected is dissolved in ether and this ethereal solution is filtered and then dried over sodium sulfate. Evaporation of the solvent then yields the product.

EXAMPLE 15

3-Benzyl-7-methoxy-2,3,4,5-tetrahydro-1,1,5,5-tetramethyl-1H-3-benzazepine

To a solution of 17.2 g. of phenyltrimethylammonium chloride in 25 ml. of absolute methanol at 25° C. is added a solution of 2.25 g. of sodium in 25 ml. of absolute methanol. The sodium chloride formed is removed by filtration in the absence of moisture and carbon dioxide. To this solution is added 25.0 g. of 3-benzyl-7-hydroxy-2,3,4,5 - tetrahydro - 1,1,5,5 - tetramethyl-1H-3-benzazepine in toluene. The mixture is then heated with stirring so as to permit removal of the solvents (100–110° C.). The reaction mixture is then cooled, washed with cold diluted aqueous sodium hydroxide solution and extracted with dilute aqueous hydrochloric acid. The acid extracts are rendered basic by the addition of aqueous ammonia.

The solid which forms is dissolved in chloroform and the solution dried over sodium sulfate. Removal of the solvent leaves the product as a residue.

Hydrogenolysis of the products of Examples 12 and 15 provides, respectively, 7-amino-2,3,4,5-tetrahydro-1,1,5,5-tetramethyl - 1H-3-benzazepine; and 7-methoxy-2,3,4,5-tetrahydro-1,1,5,5-tetramethyl-1H-3-benzazepine.

EXAMPLE 16

7-Hydroxy-2,3,4,5-tetrahydro-1,1,5,5-tetramethyl-1H-3-benzazepine and Hydrochloride 3-Benzyl - 7 - hydroxy - 2,3,4,5 - tetrahydro - 1,1,5,5-tetramethyl-1H - 3 - benzazepine hydrochloride (2.6 g., $7.5 \times 10^{-3}$ moles), 10% Pd on carbon (700 mg.) and methanol (100 ml.) are heated at 50° C. in a hydrogen atmosphere at 50 p.s.i. (Parr hydrogenation) during 5 hours. After filtration from catalyst, the solvent is removed under reduced pressure and the residue distributed between ether and NaHCO$_3$ solution. The ether solution is washed with brine, dried (Na$_2$SO$_4$) and evaporated. The residue crystallizes from acetone-hexane to give the product (1.05 g.). The analytical sample, m.p. 196–197° C. is obtained by recrystallization of a portion from acetone-hexane.

NMR (d$_6$ DMSO) 12H singlet 1.27 (4 CH$_3$), 4H singlet 2.8 (C$_2$ and C$_4$-methylenes), 2H broad peak 3.3–4.4 (—OH and NH— both exchangeable with D$_2$O), 1H quartet 6.53 (C$_8$ proton, J$_{89}$ 8.5 c.ps.; J$_{68}$ 3 c.p.s.), 1H doublet 6.86 (C$_6$ proton, J$_{68}$ 3 c.p.s.; J$_{69}$ 0 c.p.s.), 1H doublet 7.2 (C$_9$ proton, J$_{89}$ 8.5 c.p.s.; J$_{69}$ 0 c.p.s.).

*Analysis.*—Found: C, 77.01, H, 9.22, N, 6.39. C$_{14}$H$_{21}$NO requires: C, 76.66; H, 9.65, N, 6.39.

EXAMPLE 17

3-Allyl-2,3,4,5-tetrahydro-1,1,5,5-tetramethyl-1H-3-benzazepine and Hydrochloride 2,3,4,5-Tetrahydro-1,1,5,5-tetramethyl - 1H - 3 - benzazepine (2.0 g., $1 \times 10^{-2}$ moles), triethylamine (1.5 g., $1 \times 10^{-2}$ moles) and allyl bromide (1.45 g., $1.2 \times 10^{-2}$ moles) in acetonitrile (20 ml.) are allowed to stand at about 23° C. overnight. The residue is distributed between ether and saturated NaHCO$_3$ solution. The ether layer is washed with brine, dried (Na$_2$SO$_4$) and treated with a slight excess of isopropanolic hydrogen chloride. The crystalline precipitate (1.8 g., m.p. 222–224.5° C.) is recrystallized from acetone to give the product m.p. 224° C. (effervescence).

*Anal.*—Found: C, 72.72; H, 9.31; N, 4.91; Cl 12.79. C$_{17}$H$_{26}$NCl (279.85) requires: C, 72.96; H, 9.37; N, 5.01; Cl, 12.67.

EXAMPLE 18

3-Propargyl-2,3,4,5-tetrahydro-1,1,5,5-tetramethyl-1H-benzazepine and Hydrochloride A mixture of 2,3,4,5-tetrahydro - 1,1,5,5 - tetramethyl-1H - 3 - benzazepine (2 g.), triethylamine (1.5 g.), propargyl chloride (900 mg.) and acetonitrile (20 ml.) is refluxed under nitrogen during 4 hours. Solvent is removed under reduced pressure and the residue distributed between ether and NaHCO$_3$ solution. The ether solution is washed with water, brine, dried (Na$_2$SO$_4$) and treated with a slight excess of isopropanolic hydrogen chloride. The precipitate is recrystallized twice from acetone-dichloromethane to give the product, m.p. 226–227° C.

EXAMPLE 19

3-(3-Methyl - 2 - butenyl)-2,3,4,5-tetrahydro-1,1,5,5-tetramethyl-1H-3-benzazepine and Hydrochloride A solution of 2,3,4,5 - tetrahydro-1,1,5,5-tetramethyl-1H-3-benzazepine (2.0 g., $1 \times 10^{-2}$ moles), triethylamine (1.5 g., $1 \times 10^{-2}$ moles), dimethylallylbromide (1.5 g., $1.1 \times 10^{-2}$ moles) in acetonitrile (20 ml.) is refluxed during 20 min. TLC indicates mainly product, some quaternized material plus a small amount of starting material. Dimethylallyl bromide (160 mg.) is added and the solution refluxed for a further 5 minutes and the solvent is removed under reduced pressure. The residue is distributed between ether and saturated NaHCO$_3$ solution. The ether layer is washed with brine, dried (Na$_2$SO$_4$) and treated with a slight excess of isopropanolic hydrogen chloride. The crystalline precipitate is recrystallized from acetone to give the product (1.4 g.) m.p. 210–211° C. (effervescence).

*Anal.*—Found: C, 73.79; H, 9.60; N, 4.60; Cl, 11.54. C$_{19}$H$_{30}$NCl (301.9) requires: C, 73.59; H, 10.02; N, 4.64; Cl, 11.74.

EXAMPLE 20

3-(3-Chloro-2-propenyl)-2,3,4,5-tetrahydro-1,1,5,5-tetramethyl-1H-3-benzazepine

A mixture of 8.7 g. of 2,3,4,5-tetrahydro-1,1,5,5-tetramethyl-1H-3-benzazepine and 4.4 g. of cis-1,3-dichloro-1-propene are reacted by the procedure of Example 17 to yield the product.

EXAMPLE 21

3-(β-Phenyethyl)-2,3,4,5-tetrahydro-1,1,5,5-tetramethyl-1H-3-benzazepine and Hydrochloride (a) 2-methyl - 2 - [o-(1 - methyl - 1 - [phenethylcarbamoyl)ethyl)phenyl]propionic acid.—α,α' - o - phenylenediisobutyric anhydride (2.0 g., $8.65 \times 10^{-3}$ moles) in ether (50 ml.) is treated with phenethylamine (2.2 g., $1.8 \times 10^{-2}$ moles). The clear solution rapidly becomes opaque and a white oil separates. The mixture is allowed to stand overnight at room temperature. The ether-extract is acidified, washed with water, brine, and dried (Na$_2$SO$_4$). Evaporation of the ether gives a crystalline residue (3.2 g.). The analytical sample, m.p. 122–123° C. is obtained by recrystallization of a portion from acetone-hexane.

*Anal.*—Found: C, 74.69; H, 7.46; N, 3.76. C$_{22}$H$_{27}$NO$_3$ (353.44) requires: C, 74.75; H, 7.70; N, 3.96.

(b) 3 - (β-Phenethyl)-2,3,4,5-tetrahydro-1,1,5,5-tetramethyl-1H-3-benzazepine.—2-Methyl - 2 - [o-(1-methyl-1-[phenethylcarbamoyl]ethyl)phenyl]propionic acid (2.0 g.) is heated under nitrogen at 230° C. during 30 minutes. The clear cooled melt is refluxed under nitrogen with an excess of LiAlH$_4$ (2 g.) in an ether:tetrahydrofuran mixture (1:1, 160 ml.) during 40 hours. Excess hydride is decomposed by the addition of 3% aqueous NaOH (10 ml.) and the solution filtered from inorganics, stripped and the residue taken into ether. The ether layer is washed with brine, dried (Na$_2$SO$_4$) and treated with a slight excess of isopropanolic hydrogen chloride. The precipitate crystallizes from acetone-hexane to give the product (1.24° g.) m.p. 215–218° C. in two crops. The analytical sample, m.p. 214–217° C. is recrystallized from acetone-hexane.

*Anal.*—Found: C, 76.71; H, 8.71; N, 4.20; Cl, 10.55. C$_{22}$H$_{30}$NCl (343.73) requires: C, 76.82; H, 8.79; N, 4.07; Cl, 10.31.

EXAMPLE 22

3-[β-(4-Aminophenyl)ethyl]-2,3,4,5-tetrahydro-1,1,5,5-tetramethyl-1H-3-benzazepine (a) 3-[β-(4-Nitrophenyl)ethyl] - 2,3,4,5 - tetrahydro-1,1,5,5-tetramethyl-1H-3-benzazepine.—A mixture of 12 g. of 2,3,4,5-tetrahydro-1,1,5,5-tetramethyl-1H-3-benzazepine, 12 g. of 2-(4-nitrophenyl)-ethyl bromide and 8 g. of potassium carbonate in 180 ml. of dimethylformamide is stirred at 95–99° C. for eight hours. The cooled mixture is then poured into 1 l. of water and extracted into ethyl acetate. Evaporation of the extract yields the product.

(b) 3-[β-(4-Aminophenyl)ethyl] - 2,3,4,5 - 1,1,5,5 - tetramethyl-1H-3-benzazepine.—A suspension of 4.5 g. of the product of step (a) and 3 g. of 10% palladium-on-charcoal in 200 ml. of ethanol is hydrogenated in a Parr apparatus under a pressure of 40 lbs./in.$^2$. When the theoretical amount of hydrogen is absorbed, the catalyst is removed by filtration and the filtrate evaporated to dryness. The residue thus obtained is recrystallized from methanol to provide the product.

EXAMPLE 23

3-Cyclopropylmethyl-2,3,4,5-tetrahydro-1,1,5,5-tetramethyl-1H-3-benzazepine

By substituting a stoichiometrical amount of cyclopropyl carboxylic acid chloride for benzoyl chloride in the procedure of Example 8 and following the procedure therein described, and then the procedure of Example 9, the product is obtained.

In a similar fashion from equivalent amounts of n-valeryl chloride, β-methoxypropionyl chloride and β-chloropropionyl chloride, there are respectively obtained according to the procedure of Example 8–9 the compounds, 3-n-pentyl-2,3,4,5-tetrahydro-1,1,5,5-tetramethyl-1H-3-benzazepine; 3-(3-methoxypropyl)-2,3,4,5 - tetrahydro-1H-3-benzazepine; and 3-(3-chloropropyl)-2,3,4,5-tetrahydro-1,1,5,5-tetramethyl-1H-3-benzazepine.

EXAMPLE 24

3-(3-Methylaminopropyl)-2,3,4,5-tetrahydro-1,1,5,5-tetramethyl-1H-3-benzazepine

Ten grams of 3-(3-chloropropyl)-2,3,4,5-tetrahydro-1,1,55-tetramethyl-1H-3-benzazepine in a large molar excess of liquid methylamine are heated in a pressure vessel at 80° C. for eight hours. At the end of this time, the mixture is cooled and the unreacted methylamine removed by evaporation. The residue is recrystallized from acetone to yield the product.

Treatment of an acetone solution of this product with anhydrous hydrogen chloride causes precipitation of the dihydrochloride salt.

By employing other amines such as ammonia, diethylamine and the like in the procedure of this example, the corresponding N-substituted 3-aminopropyl compounds are obtained.

EXAMPLE 25

3-(3-Dimethylaminopropyl)-2,3,4,5-tetrahydro-1,1,5,5-tetramethyl-1H-3-benzazepine and Hydrochloride (a) 3-(3-dimethylaminopropyl) - 2,3,4,5 - tetrahydro-1,1,5,5-tetramethyl-1H - 3 - benzazepine - 2,4 - dione.— α,α,-o-phenylene-diisobutyric anhydride (5.0 g., 2.15 ×10⁻² moles) in ether (100 ml.) is treated with 3,N,N-dimethylaminopropylamine (5.0 g., 4.95×10⁻² moles). After 2 hours at room temperature the ether is removed under reduced pressure and the residue heated to 250° C. in an oil bath, some 3-N,N-dimethylaminopropylamine is removed under reduced pressure and the reaction maintained at 250° C. during 20 minutes. The cooled mixture is distributed between ether and saturated NaHCO₃ solution. The ether solution is washed with NaHCO₃ solution, brine, dried (Na₂SO₄) and stripped to give the product in its free base form (6 g.). IR 1710 and 1660 cm.⁻¹. A 1 g. portion in ether is treated with excess isopropanolic HCl and the precipitate crystallized from acetone (Norite) to give the product (900 mg.) m.p. 191–192° C. The analytical sample, m.p. 191–192° C. is obtained from acetone.

*Anal.*—Found: C, 64.69; H, 8.39; N, 7.66; Cl, 10.31. C₁₉H₂₉N₂O₂Cl (352.90) requires: C, 64.66; H, 8.28; N, 7.94; Cl, 10.05.

(b) 3-(3-dimethylaminopropyl) - 2,3,4,5 - tetrahydro-1,1,5,5-tetramethyl-1H-3 - benzazepine dihydrochloride, hemihydrate.—Reduction of 3-(3-dimethylaminopropyl)-2,3,4,5-tetrahydro-1,1,5,5-tetramethyl-1H - 3 - benzepin-2,4-dione (4.5 g., 1.43× 10⁻² moles) with LiAlH₄ (1.5 g., 3.95×10⁻² moles) in ether-tetrahydrofuran (1:1, 360 ml.) during 2 days followed by isolation (procedure Ex. 9) affords the product (dihydrochloride 4.0 g.). The analytical sample m.p. 240–241° C. is recrystallized from methanol-ether.

*Anal.*—Found: C, 61.52; H, 9.16; N, 7.61; Cl, 18.77. C₁₉H₃₄N₂Cl₂. ½ H₂O requires: C, 61.61; H, 9.52; N, 7.56; Cl, 19.14.

EXAMPLE 26

3-(2-Hydroxyethyl)-2,3,4,5-tetrahydro-1,1,5,5-tetramethyl-1H-3-benzazepine

Two grams of 2,3,4,5-tetrahydro-1,1,5,5-tetramethyl-1H-3-benzazepine is dissolved in sufficient absolute ethanol and the solution saturated with ethylene oxide. The saturated solution is permitted to stand for 15 hours at 25° C. and then evaporated in vacuo. The solid residue is recrystallized from acetone to yield the product.

By treatment of this product with acetic anhydride, there is obtained 3-(2-acetoxyethyl)-2,3,4,5-tetrahydro-1,1,5,5-tetramethyl-1H-3-benzazepine.

EXAMPLE 27

The procedure of Example 1, step (a) is repeated, substituting for the α,α-o-phenylenediisobutyric anhydride, stoichiometrical amounts of the following anhydrides:

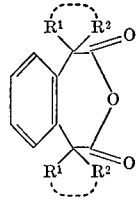

| R¹ | R² |
|---|---|
| CH₃ | CH₃CH₂ |
| CH(CH₃)₂ | CH(CH₃)₂ |
| CH₂(CH₂)₄CH₃ | CH₂(CH₂)₄CH₃ |
| —CH₂CH₂— | |
| —CH₂(CH₂)₄CH₂— | |

There are obtained the corresponding imides of the formula:

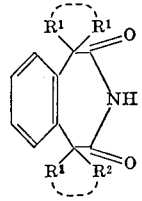

| R¹ | R² |
|---|---|
| CH₃ | CH₃CH₂ |
| CH(CH₃)₂ | CH(CH₃)₂ |
| CH₂(CH₂)₄CH₃ | CH₂(CH₂)₄CH₃ |
| —CH₂CH₂— | |
| —CH₂(CH₂)₄CH₂— | |

The procedure of Example 1, step (b) is repeated, substituting for the 2,3,4,5-tetrahydro-1,1,5,5-tetramethyl-1H-3-benzazepine-2,4-dione, stoichiometrical amounts of the above imides. There are obtained the following benzazepines:

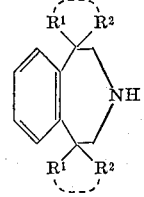

| R¹ | R² |
|---|---|
| CH₃ | CH₃CH₂ |
| CH(CH₃)₂ | CH(CH₃)₂ |
| CH₂(CH₂)₄CH₃ | CH₂(CH₂)₄CH₃ |
| —CH₂CH₂— | |
| —CH₂(CH₂)₄CH₂— | |

EXAMPLE 28

The basic product from Example 1 is dissolved in acetone and treated respectively with stoichiometrical amounts of the following acids dissolved in isopropanol: hydrobromic, sulfuric, phosphoric, methanesulfonic, acetic, lactic, succinic, malic, aconitic, phthalic, tartaric and embonic. Evaporation of the solvents leaves the corresponding acid addition salts as residues.

We claim:
1. A compound of the formula:

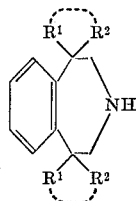

wherein $R^1$ and $R^2$, independently, are (lower)alkyl or, taken together, are $-(CH_2)_n-$ wherein $n$ is a whole number of from 2 to 6.

2. A compound as defined in claim 1 which is 2,3,4,5-tetrahydro-1,1,5,5-tetramethyl-1H-3-benzazepine.

3. A compound as defined in claim 2 in the form of an acid addition salt with hydrogen chloride.

References Cited
UNITED STATES PATENTS

| | | | |
|---|---|---|---|
| 2,520,264 | 8/1950 | Walter | 260—239 BB |
| 2,684,962 | 7/1954 | Walter | 260—239 BB |
| 3,093,632 | 6/1963 | Mull | 260—239 BB |
| 3,483,185 | 12/1969 | Tokolics et al. | 260—239 BB |

ALTON D. ROLLINS, Primary Examiner

U.S. Cl. X.R.

260—141, 239.3 B, 333, 347.8, 515 P, 518 R, 590, 635 Y